C. W. BRADLEY & G. R. UNKEFER.
FISH HOOK.
APPLICATION FILED MAY 17, 1907.
914,478.
Patented Mar. 9, 1909.
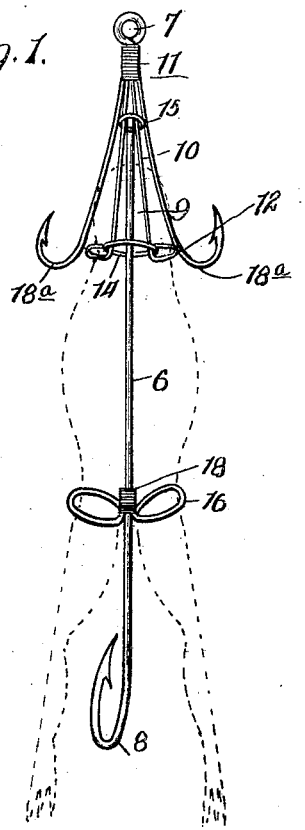
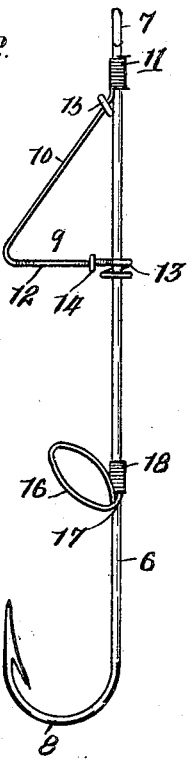
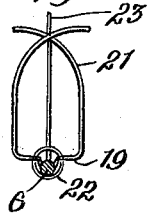
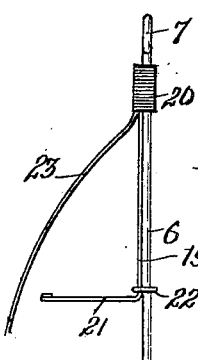
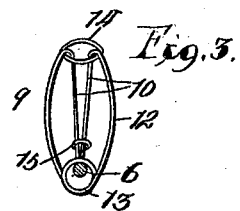
Witnesses
Wm. P. Bond
Pierson W. Banning
Inventors
Charles W. Bradley
George R. Unkefer
by Banning & Banning
Attys.

UNITED STATES PATENT OFFICE.

CHARLES W. BRADLEY AND GEORGE R. UNKEFER, OF CHICAGO, ILLINOIS.

FISH-HOOK.

No. 914,478.   Specification of Letters Patent.   Patented March 9, 1909.

Application filed May 17, 1907. Serial No. 374,308.

*To all whom it may concern:*

Be it known that we, CHARLES W. BRADLEY and GEORGE R. UNKEFER, both citizens of the United States, and residents of the city of Chicago, county of Cook, and State of Illinois, have invented certain new and useful Improvements in Fish-Hooks, of which the following is a specification.

The object of this invention is to provide a fish hook adapted to be used with frogs as bait, which will permit the frog to be clamped to the hook, and thereby keep it alive without passing the hook through the frog's mouth or body as is ordinarily done in using this class of bait. In this manner the frog can be kept alive for an indefinite period, and when used will be unimpeded in its movements in the water, which adds greatly to the attractiveness of the bait, and that without killing or hurting the frog as is ordinarily the custom.

A further object of the invention is to so construct a hook that the clamping means will also serve in the capacity of a weed guard, which makes the hook, as a whole, peculiarly suitable for casting in weedy places, which are the localities in which bass or other fish abound.

The invention consists in the features of construction and combination of parts hereinafter described and claimed.

In the drawings Figure 1 is a plan view of the hook, showing, in dotted lines, the position of the frog; Fig. 2 a side elevation of the same; Fig. 3 a cross sectional view through the shank of the hook, showing, in elevation, the clamping mechanism; Fig. 4 a side elevation of a modified form of the clamping device; and Fig. 5 a cross sectional view, showing, in elevation, the clamping mechanism of Fig. 4.

The hook of Figs. 1, 2 and 3, comprises a shank 6, having, at its upper end, an eye 7, and terminating in a barbed end 8 of the usual character. Near the upper end of the shank is a clamp 9, adapted to secure the frog around the neck and behind the jaws, which clamp is constructed of spring wire, and comprises a pair of diverging arms 10, the forward ends of which are secured immediately behind the eye 7, by means of the wrapping 11 of wire or similar material. The arms 10 diverge from one another and slope upwardly and away from the eye, as best shown in Fig. 2, and terminate at their rear ends in downwardly extending bowed clamping arms 12, which are connected together by means of a loop 13, which surrounds the shank and gives a spring action to the clamping arms, which holds them normally in divergent relation with respect to one another, but permits them to be brought together and clamped around the frog's neck. In order to provide for frogs of different sizes, two clamping loops 14 and 15 are employed, the former of which is of an elongated formation, and the latter of which is of shorter or smaller formation, which arrangement permits the clamping arms to be brought together to a greater or less extent, depending upon the size of the frog. As shown in Fig. 1, when it is desired to secure a large frog, the elongated clamping rod 14 is moved up to the angle of the clamp, at the point of juncture of the side arms and clamping arms, which brings the bolted clamping arms together sufficiently to clamp the frog's head in position. When it is desired to use the smaller clamping loop, the elongated loop is moved down toward the shank of the hook, along the clamping arms, into the position shown in Fig. 2, and the smaller or contracted loop is moved up to the angle or elbow which draws together the clamping arms to a greater degree and reduces the space between them proportionately.

In addition to the neck clamp above described, loops 16 are employed for the reception of the frog's legs, which loops are preferably formed of a single piece of stiff wire bent to provide forwardly extending ends 17, which are secured to the hook shank by means of a wrapping 18, and the two connected loops are slightly bent toward the forward end of the hook, and provide, in effect a seat for the body of the frog, through which the frog's legs extend, which seat supports the frog's body, and relieves the neck from strain or jerk when the cast is made. If desired, supplemental hooks 18[a] can be secured at the forward end of the main shank, as in Fig. 1.

Figs. 4 and 5 show a slightly different arrangement of clamp, which comprises spring side arms 19 which lie in the plane of the shank and normally diverge laterally from the forward end of the shank to which they are secured by means of a wrapping 20 in the manner heretofore described. The side arms 19 terminate in a pair of upwardly extending bowed clamping arms 21, which are adapted to overlap one another when the frog is secured, and are adapted to be brought together by means of a ring or loop 22 which slides along the shank of the hook and embraces the side arms 19. The arrangement of Figs. 4 and 5 requires a separate weed guard 23, which extends in divergent relation to the hook shank and over the clamp, being secured at its forward end by the same wrapping 20 which secures the arms of the shank. In respect to the loops for the frog legs the hook of Figs. 4 and 5 differs not at all from that hitherto described.

In use, the frog is secured by slipping the legs backwardly through the loops until the frog's body rests within the seat or saddle afforded therefor, after which the clamp of either formation is opened up by slipping back the clamping ring or loop sufficiently to permit of distention of the arms of the clamp, which opening of the clamp permits the frog's head to be inserted into such a position as to bring the neck of the frog between the clamping arms, after which the clamping ring or loop is moved up to the elbow or angle of the clamping arms, which contracts the same and secures the frog around the neck and immediately behind the jaw, in a position from which escape is impossible. At the same time the pressure is not sufficient to injure the frog or impede his movements, so that when the cast is made the frog will strike out with front and hind legs, thereby causing a commotion in the water which attracts the fish and adds greatly to the efficiency of the hook. At the same time the jerk or pull of the cast is not exerted on the head of the frog, since the frog's body will be firmly seated and supported within the seat or saddle provided by the loops, so that the frog will not be injured and will maintain his life and energy for a long time. This affords a great advantage as compared with the ordinary method of hooking a frog through the throat, which not only causes the frog to suffer, but brings the jerk or pull of every cast directly upon the tender mouth of the frog, which tears the flesh and membrane and either kills the frog in a short time or loosens the frog so that there is danger of its being torn off from the hook during the cast. The arrangement moreover is one which tends to conceal the hook beneath the body of the frog, the barb only being exposed between the legs of the frog, which arrangement renders the bait attractive and successful.

Although the invention has been described with great particularity as to detail, it is obvious that the method herein shown of forming and securing the clamp and leg loops to the back of the hook may be modified without departing from the spirit of the invention.

What we claim as new and desire to secure by Letters Patent is:

1. A fish hook for frog bait, comprising a barbed shank, a spring clamp for the neck of the frog, and loops through which the hind legs of the frog are passed, said loops being positioned one on each side of the shank and formed to provide a seat or saddle for supporting the body of the frog, substantially as described.

2. A fish hook for frog bait, comprising a barbed shank, a spring clamp comprising divergent side arms and bowed clamping arms adapted to engage the frog's neck, and a loop movable along the side arms and adapted to compress the clamping arms together, substantially as described.

3. A fish hook for frog bait, comprising a barbed shank, a spring clamp comprising divergent side arms and bowed clamping arms adapted to engage the frog's neck, a loop movable along the side arms and adapted to compress the clamping arms together, and means for securing the hind legs of the frog to the hook shank, substantially as described.

4. A fish hook for frog bait, comprising a barbed shank, a spring clamp comprising divergent side arms and bowed clamping arms adapted to engage the frog's neck, a loop movable along the side arms and adapted to compress the clamping arms together, and loops through which the hind legs of the frog are entered, said loops forming a seat or saddle for the body of the frog, substantially as described.

5. A fish hook for frog bait, comprising a barbed shank, a spring clamp comprising divergent side arms and bowed clamping arms adapted to engage the frog's neck, a loop movable along the side arms and adapted to compress the clamping arms together, and forwardly bent loops adapted to have the hind legs of the frog passed therethrough said loops forming in effect a seat or saddle for the body of the frog, substantially as described.

6. A fish hook for frog bait, comprising a barbed shank having near its forward end a spring clamp comprising rearwardly divergent side arms sloping away from the shank and secured at their forward or convergent ends to the shank, said side arms terminating in bowed clamping arms, a spring loop surrounding the shank, and connecting the clamping arms, a clamping loop slidable along the divergent side arms and adapted to bring them together around a frog's neck, and a seat or saddle comprising two loops secured to the shank and adapted to support the body of the frog and permit the hind legs of the frog to be passed therethrough.

CHARLES W. BRADLEY.
GEORGE R. UNKEFER.

Witnesses:
WALKER BANNING,
PIERSON W. BANNING.